May 7, 1968
J. H. DEWAR
3,381,988
SEALED CONSTRUCTION
Filed March 1, 1966
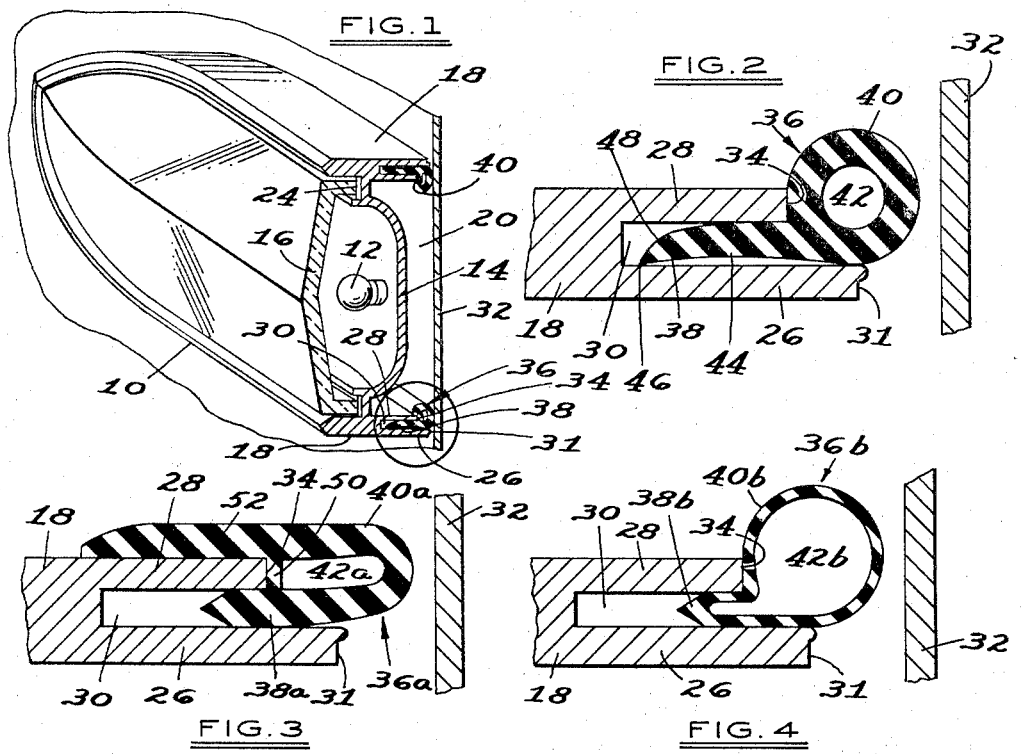
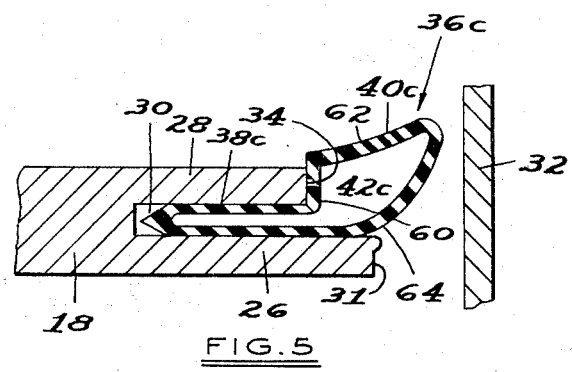
INVENTOR
JOHN H. DEWAR
BY
John R. Faulkner
Keith L. Zerschling
ATTORNEYS United States Patent Office 3,381,988
Patented May 7, 1968

3,381,988
SEALED CONSTRUCTION
John H. Dewar, Dearborn, Mich., assignor to Ford Motor Company, Dearborn, Mich., a corporation of Delaware
Filed Mar. 1, 1966, Ser. No. 530,823
7 Claims. (Cl. 287—189.36)

ABSTRACT OF THE DISCLOSURE

Lamp bezels, door handles, outside mirrors, and other members can be sealingly mounted on vehicle bodies using the sealed construction of this invention with the seal substantially hidden from view. The seal comprises a tail portion that is inserted into a channel formed in the outer wall of the mounted member and a head portion that is compressed between the inner leg defining the channel and the base member. By deforming the tail portion within the channel, the seal is retained in the mounted member prior to assembly of the mounted member onto the base member.

---

This invention provides a sealed construction in which the seal between a mounted member and the surface of a base member supporting the mounted member is hidden from one side. The construction is particularly useful where the mounted member is an enclosure since the seal is then hidden entirely from external view.

Flat seals traditionally used for mounting lamp bezels, door handles, outside mirrors, and other members on vehicle bodies extend around the edges of the mounted member. The visible seal seriously detracts from the overall aesthetic appearance of the assembly. In addition, flat seals are mislocated easily during installation, thereby increasing the undesirable appearance and decreasing sealing effectiveness. Attempts to overcome these difficulties by bonding the seals in place are expensive and time consuming and, of course, do not eliminate the unsightly appearance of a properly installed seal.

These disadvantages are overcome by the sealed construction of this invention. This sealed construction comprises a base member and a mounted member. The mounted member has an outer leg terminating in an edge adjacent to surface of the base member and an inner leg defining an open channel with the outer leg. A deformable seal having a tail portion and a head portion has the tail portion inserted into the channel so the head portion sealingly engages the surface of the base member inside the outer leg. Depending on the assembled clearance between the outer leg and the base member, the seal is difficut to see from beyond the outer leg and becomes completely hidden when the edge of the outer leg contacts the base member.

In refined versions of the construction of this invention the inner leg is shorter than the outer leg, thereby decreasing the chance of error during assembly and increasing the ease of assembly. Part of the head portion of the seal can be engaged between the shorter inner leg and the surface of the member to increase the seal effectiveness and provide cushioning between the mounted member and the base member. The cushioning effect is particularly useful in constructions comprising thin walled mounted members. The tail portion can be bonded into the open channel or it can be held within the channel by deformation, thereby maintaining assembly of the seal with the mounted member when the seal is free of contact with the base member. Seals having head portions of substantially circular cross section are economical to make and are easy to assemble into the construction of this invention.

Further advantages of this sealed construction will appear from the following detailed description of the drawings in which:

FIGURE 1 is a cross-sectional assembly view of a sealed construction of this invention in which an automobile tail lamp assembly is assembled onto a vehicle body;

FIGURE 2 is an exploded view of the circled portion of FIGURE 1;

FIGURE 3 is a cross-sectional exploded view of a construction in which the seal comprises a second tail portion that locates on the back of the inner leg;

FIGURE 4 is an exploded view of a construction in which the seal has a substantially circular head with both the head and the tail being hollow; and FIGURE 5 is an exploded view of a construction in which the seal has a triangular-shaped head, with both the head and the tail being hollow.

Referring to FIGURE 1, the mounted member is a lamp bezel 10 that has a light bulb 12 mounted in an inner support member 14. A lens 16 is mounted on member 14 and encloses bulb 12. A lens cushion 24 extends around the lower edge of lens 16 cushioning the latter in bezel 10.

Bezel 10 has upstanding side members 18 enclosing an open space 20 below member 14. The lower portion of each side member 18 comprises an outer leg 26 and a shorter inner leg 28. Legs 26 and 28 define a channel 30 therebetween that is open at the lower end of side member 18.

Outer leg 26 terminates in an edge 31 that is adjacent a surface of the base member which is a vehicle body 32. Sealing ability is improved when the surface of body 32 between legs 26 and 28 is substantially planar as shown. Bezel 10 is attached to body 32 by conventional means such as threaded fasteners (not shown). Inner leg 28 also terminates in an edge 34 adjacent body 32 but more removed therefrom than edge 31 because of the shorter nature of inner leg 28. A seal 36 has a tail portion 38 extending into channel 30 and a head portion 40 compressed between edge 34 and body 32.

FIGURE 2 shows the circled portion of FIGURE 1 exploded to remove the distortion from head portion 40 of seal 36. Head portion 40 has a substantially circular cross section with a concentric hollow passage 42 therein. Tail portion 38 projects tangentially from head portion 40 at one side thereof. The front side 44 of tail portion 38 is slightly concave from head portion 40 to a tip 46. Rear side 48 of tail portion 38 is slightly convex from head portion 40 to tip 46. Tail portion 38 is mounted in channel 30 so that side 44 is adjacent the rear surface of outer leg 26 and side 48 is adjacent the front surface of inner leg 28.

Seal 36 generally is made of a resilient material such as rubber. The radius of curvature of front side 44 is designed so tail portion 38 is deformed within channel 30 to hold seal 36 in its assembled position with side member 18 when head portion 40 is out of contact with body 32.

When member 18 is moved closer to body 32 in FIGURE 2, the front part of head portion 40 is deformed between body 32 and edge 34, thereby providing a seal between member 18 and body 32. The rear part of head portion 40 extends into space 20 behind inner leg 28 (see FIGURE 1). In the assembled position, seal 36 is substantially hidden from view from beyond the outer surface of leg 26 since outer leg 26 is either close to or in contact with body 32.

Referring to FIGURE 3 a seal 36a having a semi-elliptical head 40a is shown. Head 40a contains a semi-elliptical hollow 42a. The flat 50 across the base of head 40a contacts edge 34 of inner leg 28. Projecting from head 40a on either side of flat 50 are tails 38a and 52. Tail 38a is inserted in channel 30 and tail 52 engages the rear surface of inner leg 28 to maintain assembly of seal 36a with member 18. As member 18 is moved toward body 32 in FIGURE 3, head 40a deforms between edge 34 and body 32 to form a sealed construction. Part of head 40a can deform into the space behind leg 28 if desired.

In FIGURE 4 a seal 36b has a head 40b of substantially circular cross section and a tail 38b projecting tangentially from head 40b. Both head 40b and tail 38b contain a hollow 42b. Deformation of tail 38b within channel 30 maintains assembly of seal 36b with member 18. When member 18 is moved toward body 32, deformation of head 40b takes place between edge 34 and body 32 as described above to produce a sealed construction.

In FIGURE 5 a seal 36c has a head 40c and a tail 38c. Head 40c is triangular shaped and engages edge 34 along one triangle leg 60. The other triangle leg 62 angles downward and rearward of edge 34. The hypotenuse 64 of the triangle curves upward and forward toward leg 26 of member 18 and runs smoothly into tail 38c. Both head 40c and tail 38c contain a hollow portion 42c. When member 18 is moved toward body 32 in FIGURE 5, sealing takes place between edge 34 and body 32 substantially as described above.

If desired, tail portions 38 can extend radially from head portions 36 of seals used in the construction of this invention. Imparting a rearward curve to the tail portion of such a construction facilitates proper seal location during assembly. The terms "head portion" and "head" are used herein to identify that part of the seal protruding below channel 30, and both the head and tail portions can have a wide variety of configurations.

The invention thus provides a sealed construction in which the seal is essentially hidden from view from at least one side. The sealed construction is easy to assemble and is particularly useful within walled members and members stationary relative to each other when assembled such as assemblies of emblems, lamp bezels, moldings, outside door handles and mirrors to vehicle bodies.

It is emphasized that the invention is not limited to the exact constructions shown or described but that changes and modifications can be made without departing from the spirit and scope of the invention as defined in the claims.

I claim:
1. A sealed construction comprising
   a base member,
   a member having an outer surface and a flange depending therefrom, said flange defining an enclosure, said member being clamped onto said base member, said flange having an exterior leg terminating in an edge closely adjacent a surface of said base member and an interior leg defining an open channel with said exterior leg, said interior leg being shorter than the exterior leg so as to be spaced from the surface of the base member, and
   a deformable seal having a tail portion and an enlarged bulbous head portion directed toward the interior of said enclosure, said tail portion being securely retained within said channel and said head portion being deformed into sealing engagement between said interior leg and the surface of said base member inside of said exterior leg, said exterior leg being sufficiently close to the surface of the base member to substantially hide the seal from view.

2. The construction of claim 1 in which the surface of the base member is substantially planar between said legs.

3. The construction of claim 2 in which the tail portion is deformed within the channel to maintain assembly of the seal with the mounted member when the seal is free of contact with the base member.

4. The construction of claim 3 in which the edge of the outer leg contacts the surface of the base member.

5. The construction of claim 4 in which the head portion has a substantially circular cross section when the seal is free of contact with the base member.

6. The construction of claim 1 in which the tail portion is deformed within the channel to maintain assembly of the seal with the mounted member when the seal is free of contact with the base member.

7. The construction of claim 1 in which the edge of the outer leg contacts the surface of the base member.

References Cited
UNITED STATES PATENTS

| | | | |
|---|---|---|---|
| 1,763,603 | 6/1930 | Donahue | 49—489 |
| 1,787,169 | 12/1930 | Roberts | 49—489 |
| 2,180,177 | 11/1939 | Ternstrom | 49—498 |
| 2,952,053 | 9/1960 | Frehse | 49—489 |

EDWARD C. ALLEN, *Primary Examiner.*

RAMON S. BRITTS, *Assistant Examiner.*